(12) United States Patent  (10) Patent No.: US 9,038,106 B2
Kritt et al.  (45) Date of Patent: May 19, 2015

(54) DISPLAY TAG CLOUD VIEWER INTERACTIVE INTERFACE FOR ENABLING A VIEWER TO QUICKLY AND EFFECTIVELY ACCESS A DESIRED TELEVISION PROGRAM FOR VIEWING

(71) Applicant: LENOVO ENTERPRISE SOLUTIONS (SINGAPORE) PTE. LTD., New Tech Park (SG)

(72) Inventors: Barry A Kritt, Raleigh, NC (US); Sarbajit K Rakshit, Kolkata (IN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 13/758,140

(22) Filed: Feb. 4, 2013

(65) Prior Publication Data

US 2014/0223485 A1  Aug. 7, 2014

(51) Int. Cl.
*G06F 3/00* (2006.01)
*G06F 13/00* (2006.01)
*H04N 5/445* (2011.01)
*H04N 21/482* (2011.01)

(52) U.S. Cl.
CPC ................................ *H04N 21/4821* (2013.01)

(58) Field of Classification Search
USPC ............................................... 725/39, 44–45
See application file for complete search history.

(56) References Cited

U.S. PATENT DOCUMENTS

| | | | |
|---|---|---|---|
| 8,122,472 B2 * | 2/2012 | Krieger et al. | 725/53 |
| 2009/0037355 A1 | 2/2009 | Brave et al. | |
| 2009/0076899 A1 * | 3/2009 | Gbodimowo | 705/14 |
| 2011/0179434 A1 | 7/2011 | Jorg | |
| 2012/0117581 A1 * | 5/2012 | Curtis et al. | 725/9 |
| 2013/0007618 A1 * | 1/2013 | Dodson et al. | 715/716 |
| 2013/0173533 A1 * | 7/2013 | Nichols | 707/609 |

* cited by examiner

*Primary Examiner* — Mulugeta Mengesha
(74) *Attorney, Agent, or Firm* — Katherine Brown

(57) ABSTRACT

A displayed matrix having a menu of presentation genres and an opposing menu of ranking systems prioritizing each genre according to the values of a set of parameters. A viewer is enabled to select at least one genre from the menu and the viewer is also enabled to select at least one ranking system. Selections are correlated to generate a set of proposed presentations prioritized in accordance with the parameter values of a selected ranking system and displayed as a tag cloud wherein each of the proposed presentations is visually distinguished according to the priority ranking of the proposed television program presentation.

21 Claims, 5 Drawing Sheets

DISPLAY TAG CLOUD VIEWER INTERACTIVE INTERFACE FOR ENABLING A VIEWER TO QUICKLY AND EFFECTIVELY ACCESS A DESIRED TELEVISION PROGRAM FOR VIEWING

TECHNICAL FIELD

The present invention relates to computer controlled presentation of television programming, and particularly to implementation for enabling viewers to quickly and effectively access the most desirable television program for viewing at a particular time.

BACKGROUND OF RELATED ART

In the long gone past, people planned their television viewing in a relatively leisurely way. There were, at best, about a dozen choices for any given time period. Thus, the selection of a television program for viewing or recording required less than a minute.

However, at the present time, television programming provided by the service providers, together with what is accessible and stored by the viewer, often run into the hundreds of television programs available from hundreds of channels for any given time period. In addition, television programs are no longer just viewed on the conventional television set. Now television programs are accessed on personal computers, wireless mobile devices such as cellular telephones, or personal digital assistants. Often, the viewers are "on-the-go", e.g. waiting at airports, commuting on buses and trains, waiting in lines. Thus, many potential viewers have free time to view in the order of one-half to one hour. Obviously, such viewers do not have very much time to sort through listings to find their optimum programs for viewing. Thus, the television presentation technology has been seeking ways to shorten television program selection times. The present invention offers an implementation for significantly shortening such selection times.

SUMMARY OF THE PRESENT INVENTION

The present invention provides the viewer who is seeking a desirable television program with a displayed matrix having a menu of presentation genres and an opposing menu of ranking systems prioritizing each genre according to the values of a set of parameters. The viewer is enabled to select at least one genre from the menu and is further enabled to select at least one ranking system. These selections are correlated to generate a set of proposed presentations prioritized in accordance with the parameter values of a selected ranking system. This generated set of proposed presentations is displayed as a tag cloud wherein each of the proposed presentations is visually distinguished according to the priority ranking of the proposed television program presentation. The proposed television programs may be respectively represented by tags visually distinguished according to priority by tag size. The proposed television programs may also be respectively represented by tags visually distinguished according to priority by tag color. The proposed television programs may further be respectively represented by tags visually distinguished according to priority by tag position within the cloud.

In accordance with an aspect of the invention, the viewer is enabled to select a plurality of genres, and the correlating ranking system that will generate a set of prioritized proposed television programs of the combined genres of the plurality of genres. Also, the proposed television programs, respectively, may be represented by tags visually distinguished according to priority by tag size and in position based upon the individual genres in the plurality of genres.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
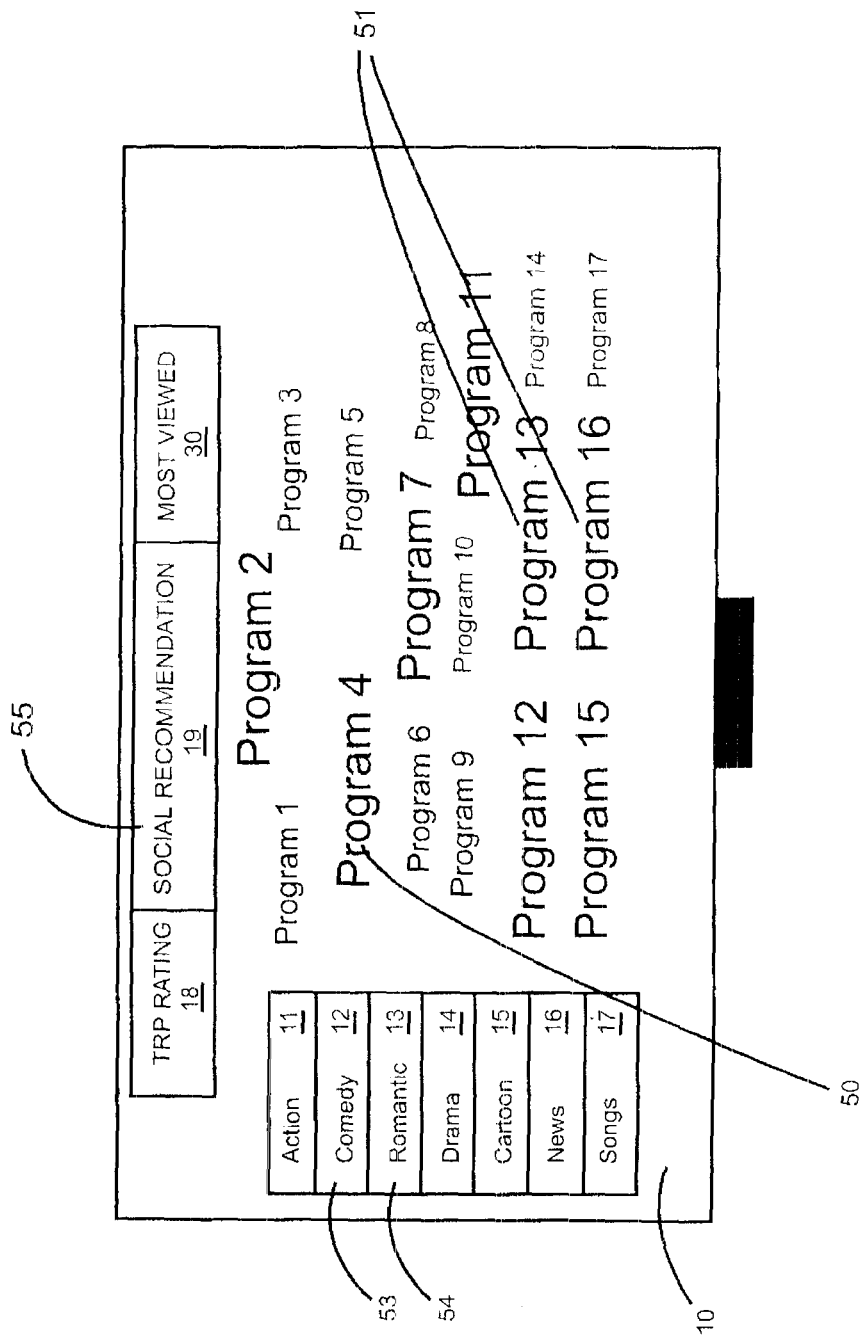
FIG. 1 is a generalized view of a displayed tag cloud resulting from viewer entries on the genre menu and the rankling system menu.

Referring to FIG. 1, there is shown a generalized view of a displayed tag cloud resulting from viewer entries on the genre menu and the ranking system menu. The viewer selects an item from items 11-17 in the genre menu. In the present example, the viewer has selected 53 and 54, comedy and romantic as the genres for his desired television program. The viewer has also selected 55 from ranking system menu items 18, 19 and 30, social media ranking system 19. The resulting tag cloud 51 is generated by determining the frequency that an item, e.g. 53 or 54, from the genre system receives a significant ranking from the ranking system. There are multitudes of ranking systems for television programs including frequency of public viewing. Here, the viewer has selected 55 Recommendation by a Social Medium. In other words, the present viewer feels his tastes are most in line with his selected social medium.

It should also be noted that in creating the tag cloud, the user may superimpose their personal like/dislike profile on the tag cloud generated selections. The user may like/dislike specific actors, directors or sub-genres such as programs in particular languages.

The tag cloud in FIG. 1 has the recommendations prioritized according to the size of the tag wherein the larger, the higher the recommendation. The tags may also be prioritized according to color or even position in the tag cloud. Also, as in the present example, two genres have been selected, Romantic and Comedy, the cloud generating system can correlate the two.

Figure 2:
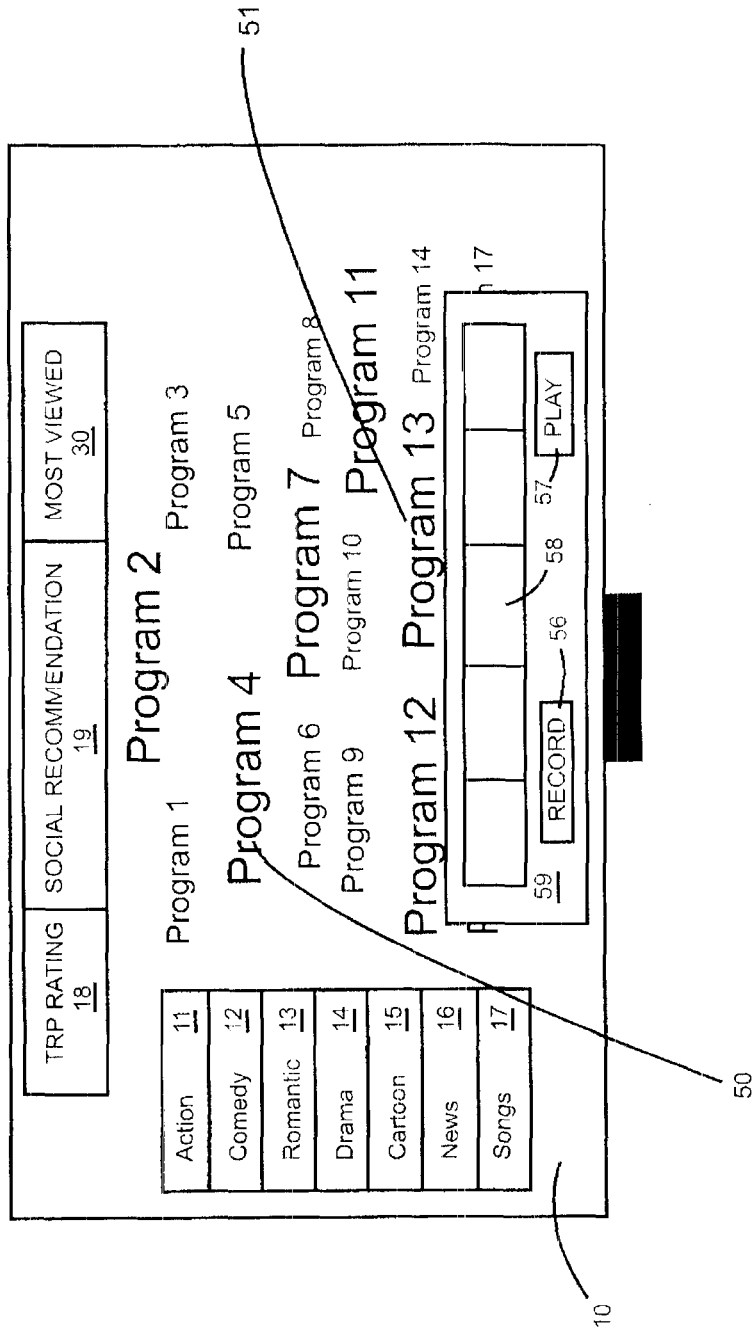
FIG. 2 is the view of claim 1 after the viewer has made a selection from the tag cloud.

From the tag cloud in FIG. 2, the user has selected 50 "Program 4," which was prioritized as the largest in size. The user is prompted, dialog box 59, to either record 56 the program, play 57 or other options 58.

Figure 3:
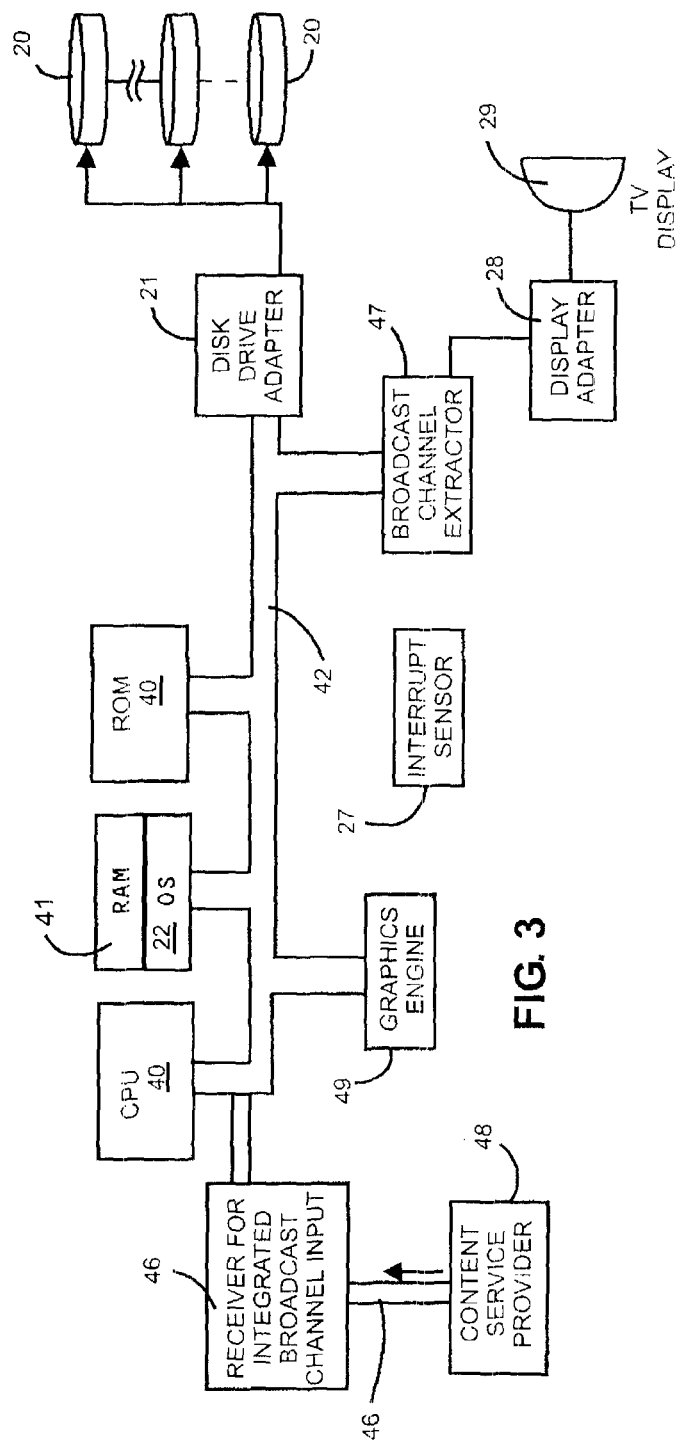
FIG. 3 is a generalized view of the computer controlled system of the present invention organized wherein the television programming is provided by a service provider, as well as from viewer storage and direct broadcast input.

Now, with reference to FIG. 3 there will be described a generalized view of the computer controlled system of the present invention organized wherein the television programming is provided by a service provider, as well as from viewer storage and direct broadcast input. The present invention may be implemented on any apparatus providing computer control of a television set so that the control programs of this invention may be operated with the equipment. The receiver 45 at the viewer's site receives the content input 46 from the service provider 48. The apparatus shown connected to receiver 45 may be conveniently housed in a television set top box or integrated within a unitary television set.

The operations involved in the present invention are controlled by a data processing system under the control of a central processing unit 40, which, in turn, is interconnected to various other components by system bus 42. An operating system (OS) 22 that runs on processor 40 provides control and is used to coordinate the functions of the various components of the control system. The OS 22 is stored in Random Access Memory (RAM) 41. The control programs for the functions, including those for generating the tag clouds and enabling the viewer to select the menu items, may be permanently stored in Read Only Memory (ROM) 13 and moved into and out of RAM to perform their respective functions. In the normal operation for real-time television program playing, the integrated incoming data stream, under CPU control, is applied to broadcast channel extractor 47 that extracts the data representative of the television program scheduled for the channel that the user has selected and applies the extracted data to a conventional television display adapter 28 to be displayed on the user's television set 29.

When the incoming unitary data stream is selected to be recorded on a DVR, the signal is processed through a disk drive adapter 21 and stored on disk drives 20. In the conventional operation of a DVR, the television program scheduled for a given channel at a given time is extracted by extractor 17 in response to an interrupt sensor and then stored on a disk drive 20 provided on the DVR. The tag cloud may be generated using any conventional graphics engine associated with the operating system.

Now, with reference to the programming shown in FIG. 3, there will be described how the system and programs of the present invention are set up. Provision is made for furnishing to a television receiver, television programs available from live and database sources, step 61. The database sources are intended to include programs previously recorded locally, e.g. on the user's DVR.

Provision is made for displaying to a viewer, a matrix of a menu of presentation genres and an opposing menu of ranking systems that, respectively, prioritize each genre based on the values of a set of parameters, step 62. Provision is made for enabling a viewer to select at least one genre from the genre menu, step 63, and provision is made for enabling a viewer to select at least one ranking system, step 64. Provision is then made for correlating the selected genre with the selected ranking system to generate a set of proposed television programs prioritized in accordance with the parameter values of the selected ranking system, step 65. Then, provision is made for displaying the set of proposed television programs generated in step 65 as a tag cloud in which each of proposed television programs is visually distinguished according to the priority rankings of the television programming, step 66.

Figure 4:
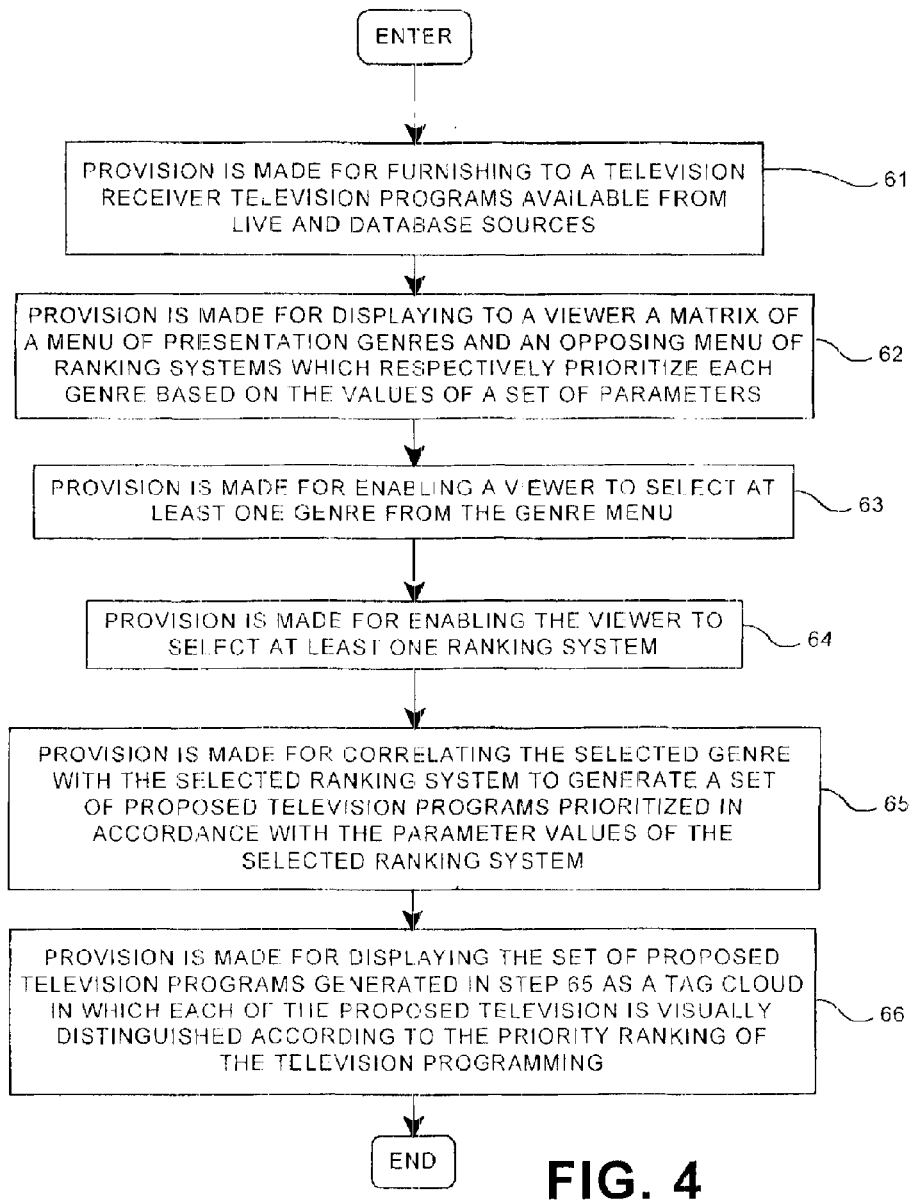
FIG. 4 is a flowchart describing how the implementation program of the present invention provides and implements the tag cloud of prioritized television program content.
Figure 5:
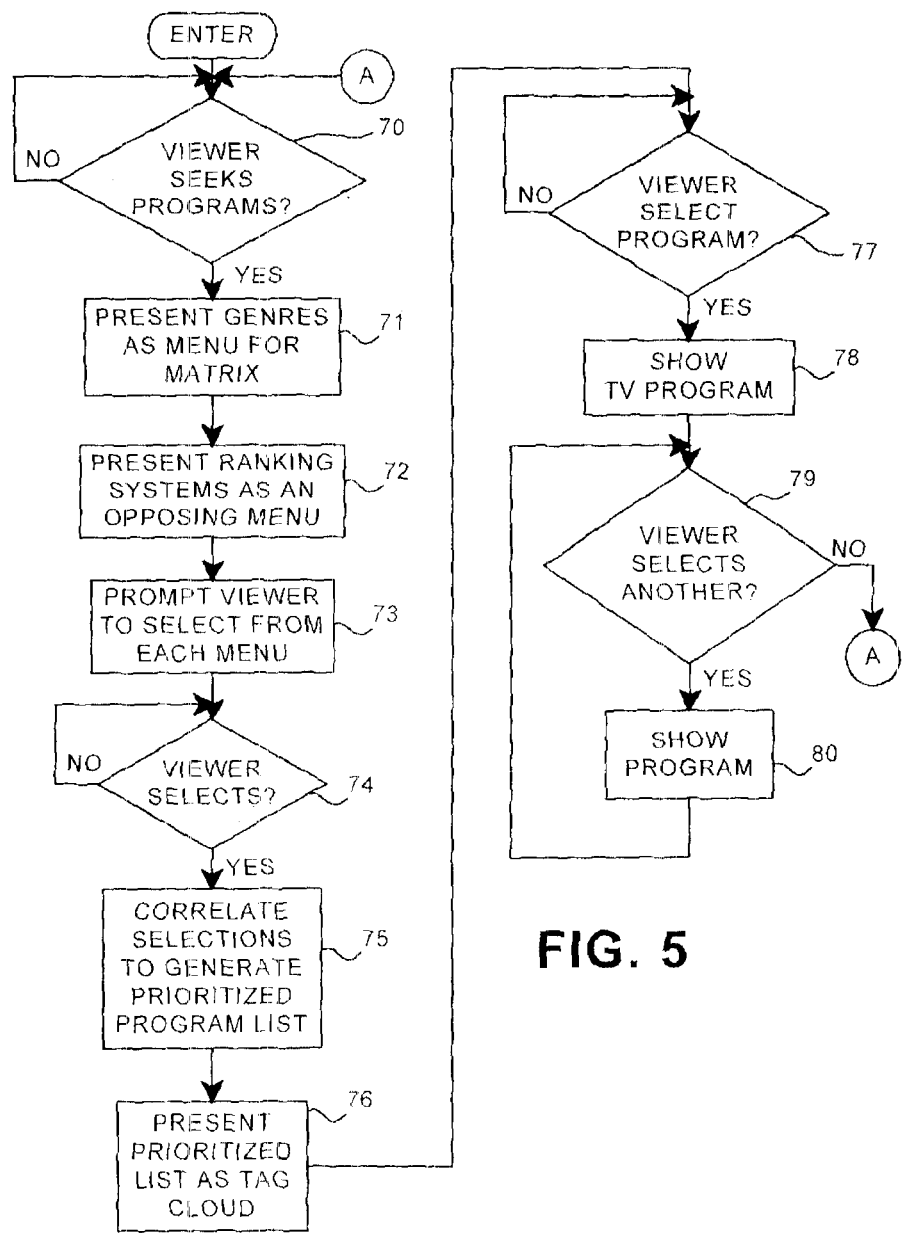
FIG. 5 is an illustration of a basic run of the program described in FIG. 4.

With respect to FIG. 5, there will be described a simple run of the program described in FIG. 4. There is an initial determination made, step 70, as to whether the viewer seeks to select a suitable television program. If Yes, the genre 71 and the ranking system 72 are presented and the viewer prompted 73 to select a genre and a ranking system. A determination is made, step 74, as to whether the viewer has made the selections from each menu. If Yes, the viewer selections are correlated to generate a prioritized list, step 75, and the generated list is displayed as the tag cloud, step 76. A determination is then made as to whether the viewer has selected a television program from the cloud, step 77. If Yes, the television program is shown, step 78. Then a determination is made as to whether the viewer has selected another program, step 79. If Yes, the program is shown, step 80. If No, the process is returned to step 70 via branch "A".

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, at hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or is part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination oil one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A computer controlled display method for enabling a viewer of electronic entertainment presentations to select the best presentation currently available from live and database sources comprising:
    displaying a matrix having a menu of presentation genres and an opposing menu of a plurality of different kinds of unrelated ranking systems prioritizing each genre according to the values of a set of parameters;
    enabling the viewer to select at least one genre;
    enabling the viewer to select at least one ranking system;
    correlating the selected genre with the selected ranking system to generate a set of proposed presentations prioritized in accordance with the parameter values of a selected ranking system; and
    displaying said generated set of proposed presentations as a tag cloud wherein each of the proposed presentations is visually distinguished according to the priority ranking of the proposed presentation.

2. The method of claim 1, wherein said presentations are television programs.

3. The method of claim 2, wherein the proposed television programs are respectively represented by tags visually distinguished according to priority by tag size.

4. The method of claim 2, wherein the proposed television programs are respectively represented by tags visually distinguished according to priority by tag color.

5. The method of claim 2, wherein the proposed television programs are respectively represented by tags visually distinguished according to priority by tag position within the cloud.

6. The method of claim 2, wherein:
    the viewer is enabled to select a plurality of genres, and
    said correlating will generate a set of prioritized proposed television programs of the combined genres of said plurality of genres.

7. The method of claim 6, wherein the proposed television programs are respectively represented by tags visually distinguished according to priority by tag size, and in position based upon the individual genres in said plurality of genres.

8. A computer controlled system for enabling a viewer of electronic entertainment presentations to select the best presentation currently available from live and database sources comprising:
    a processor; and
    a computer memory holding computer program instructions which when executed by the processor perform the method comprising:
    displaying a matrix having a menu of presentation genres and an opposing menu of a plurality of different kinds of unrelated ranking systems prioritizing each genre according to the values of a set of parameters;
    enabling the viewer to select at least one genre;
    enabling the viewer to select at least one ranking system;
    correlating the selected genre with the selected ranking system to generate a set of proposed presentations prioritized in accordance with the parameter values of a selected ranking system; and
    displaying said generated set of proposed presentations as a tag cloud wherein each of the proposed presentations is visually distinguished according to the priority ranking of the proposed presentation.

9. The system of claim 8, wherein said presentations are television programs.

10. The system of claim 9, wherein the proposed television programs are respectively represented by tags visually distinguished according to priority by tag size.

11. The system of claim 9, wherein the proposed television programs are respectively represented by tags visually distinguished according to priority by tag color.

12. The system of claim 9, wherein the proposed television programs are respectively represented by tags visually distinguished according to priority by tag position within the cloud.

13. The system of claim 9, wherein:
the viewer is enabled to select a plurality of genres in the performed method, and
said performed correlating will generate a set of prioritized proposed television programs of the combined genres of said plurality of genres.

14. The system of claim 13, wherein the proposed television programs are respectively represented by tags visually distinguished according to priority by tag size, and in position based upon the individual genres in said plurality of genres.

15. A non-transitory computer usable storage medium having stored thereon a computer readable program for enabling a viewer of electronic entertainment presentations to select the best presentation currently available from live and database sources, wherein the computer readable program when executed on a computer causes the computer to:
display a matrix having a menu of a plurality of different kinds of unrelated ranking systems prioritizing each genre according to the values of a set of parameters;
enabling the viewer to select at least one genre;
enable the viewer to select at least one genre;
enabling the viewer to select at least one ranking system;
correlate the selected genre with the selected ranking system to generate a set of proposed presentations prioritized in accordance with the parameter values of a selected ranking system; and
display said generated set of proposed presentations as a tag cloud wherein each of the proposed presentations is visually distinguished according to the priority ranking of the proposed presentation.

16. The computer readable storage medium of claim 15, wherein said presentations are television programs.

17. The computer readable storage medium claim 16 herein the proposed television programs are respectively represented by tags visually distinguished according to priority by tag size.

18. The computer readable storage medium of claim 16, wherein the proposed television programs are respectively represented by tags visually distinguished according to priority by tag color.

19. The computer readable storage medium of claim 16, wherein the proposed television programs are respectively represented by tags visually distinguished according to priority by tag position within the cloud.

20. The computer readable storage medium of claim 16, wherein said computer program when executed causes said correlating to generate a set of prioritized proposed television programs of the combined genres of said plurality of genres.

21. The computer readable storage medium of claim 19, wherein:
the computer program when executed enables the viewer to select a plurality of genres, and
the proposed television programs are respectively represented by tags visually distinguished according to priority by tag size, and in position based upon the individual genres in said plurality of genres.

* * * * *